2,898,355
PROCESS FOR THE PREPARATION OF CYCLO-PENTADIENYL GROUP IV-A METAL DIALKOXY MONOHALIDES

Daniel F. Herman, Orange, N.J., and Roger M. Weil, Brooklyn, N.Y., assignors to National Lead Company, New York, N.Y., a corporation of New Jersey No Drawing. Application August 25, 1955
Serial No. 530,607

9 Claims. (Cl. 260—429.5)

This invention relates to organometallic compounds and methods for their preparation. In particular, this invention relates to a new, economical method for the synthesis of stable organometallic compounds of the transition elements of the fourth group of the periodic table.

In application Serial No. 443,956, filed by Daniel F. Herman on July 16, 1954, and assigned to the assignee hereof, there are described and claimed a series of compounds of extraordinary stability in which either one or two carbon atoms, each of which is a member of a five-membered ring, are linked directly to an atom of a fourth-group metal, e.g. a titanium or zirconium atom. The unusual stability of the cyclopentadienyltitanium or zirconium linkage thus opened up a new field for the formation of stable high polymers and resinous materials based on a Ti—O—Ti—O—Ti— polymer chain with the organic moiety linked directly to the metal atoms.

Such materials, however, have been relatively expensive and difficult to prepare because the methods of synthesis employed involved at least two steps and necessitated the use of expensive organometallic reagents which are difficult to handle. For example, it was necessary as a first step to prepare an organometallic arylating agent such as cyclopentadienyl magnesium bromide, cyclopentadienylsodium or cyclopentadienyllithium, which was then reacted with substances containing the fourth-group metal to produce the desired organometallic compounds. These organometallic arylating agents are difficult to prepare, require the use of an inert atmosphere, entail some danger in operation and generally result in unsatisfactory yields.

It is therefore an object of this invention to provide an improved method for the preparation of organometallic compounds of fourth-group metals. Another object is to provide a one-step method for the production of such compounds. An additional object is to provide a method for the preparation of such compounds which eliminates the necessity of preparing or handling organometallic reagents. Other objects and advantages will become apparent from the following more complete description and claims.

Broadly, this invention comprises a method for the preparation of organometallic compounds of metals of group IVa of the periodic table which comprises reacting an organic compound selected from the group consisting of cyclopentadiene and substituted cyclopentadienes with a fourth-group metal compound representable by the formula $(RO)_{4-n}MeX_n$, wherein R is an aliphatic radical containing up to 18 carbon atoms, Me is a fourth-group metal, X is a halogen atom, and $n$ is from 1 to 3, in the presence of a basic condensing agent. Addition compounds, as opposed to substitution compounds, for example tetrachlorocyclopentane and the like are, however, excluded.

R, in the above formula, may be substantially any saturated aliphatic group containing up to about 18 carbon atoms, including, for example, methyl, ethyl, propyl, isopropyl, n-, sec-, or tert-butyl, hexyl, octyl, et cetera.

The fourth-group metal may be any metal from group IVa of the periodic table, or mixtures thereof, but particularly preferred because readily available, are titanium and zirconium. Similarly, X may be any halogen but Cl and Br are preferred for economic reasons.

The basic condensing agent may be substantially any basic-reacting compound providing it is sufficiently basic to have an ionization constant of at least $10^{-4}$ (measured in water), but particularly desirable are the secondary and tertiary aliphatic amines and heterocyclic amines.

Certain features of this process should be emphasized for it is in these that the success of the reaction lies. The first is the use of a mixed alkoxy metallohalide as for example dibutoxy titanium dichloride. This compound is used in preference to either tetraalkyl titanates such as butyl titanate or titanium tetrahalides such as titanium tetrachloride. The former is inoperative, while the latter is capable of yielding only very small amounts of product. The base, mixed with the cyclopentadiene, is added to the titanium compound, the amount of base used being equivalent to the amount of halogen in the alkoxy titanium halide. The purpose of the above is two-fold: (1) The addition of the base to the cyclopentadiene prevents the polymerization of the cyclopentadiene and high yields are obtainable. Very low yields have been reported in the literature for experimental preparations in which these precautions were not taken. (2) The use of a mixed alkoxy titanium chloride and an equivalent amount of an amine does not result in insoluble titanium-amine complexes which might hinder the reaction. Thus, the reaction mixture is initially a single liquid phase; on heating, the desired product is formed in high yield while the amine hydrochloride by-product precipitates from the reaction mixture. If titanium tetrachloride is used very poor yields are obtained. This is attributed to the formation of an insoluble titanium-amine-chloride couple which is incapable of reacting with the cyclopentadiene to form the desired product.

The alkoxy metal halides used in the method of this invention may be prepared or procured separately and used as such in the process. For convenience, however, it is usually preferable to prepare them in situ, by reaction between an appropriate metal halide and an alkylate of the same metal. Thus, instead of using dibutoxytitanium dichloride, one may use equimolecular amounts of tetrabutyl titanate and titanium tetrachloride. These two materials react to form dibutoxytitanium dichloride. See Jennings et al., J. Chem. Soc. 1936, 637 (Chem. Abs. 30, 5180 (1938)).

Example I 77 g. titanium tetrachloride are added to 136 g. butyl titanate in excess benzene under stirring and moisture-free conditions to prevent hydrolysis.

A cooled solution of 120 g. of freshly distilled cyclopentadiene, 160 g. of triethylamine, and 150 g. benzene as solvent, is added dropwise to the chlorinated titanate. When the addition is completed, the reddish solution is heated to about 75° C. and the low-boiling cyclopentadiene is refluxed for several hours. During the refluxing, triethylamine hydrochloride is formed and precipitated as a white powder insoluble in benzene.

The triethylamine hydrochloride is filtered under moisture-free conditions in a nitrogen atmosphere and the solvent is removed by normal pressure distillation. The Ti—C compound (cyclopentadienyl dibutoxytitanium chloride) is then isolated by vacuum distillation. (B.P. 145–150° C. at 2–3 mm. of mercury).

The amount of monocyclopentadienyl-derivative formed during such synthesis approximates 80%, and about 2% of red crystals of dicyclopentadienyltitanium dichloride were also synthesized.

Example II

Using the same conditions and the same proportions of the starting compounds but employing piperidine instead of triethylamine, the cyclopentadienyl dibutoxytitanium monochloride was obtained in high yield. In this experiment, no formation of the red crystals was noticed.

The process of this invention provides a simple, inexpensive and easy method for preparation of organometallic compounds from metals of group IVa of the periodic table. While the present invention has been described with reference to certain examples and specific embodiments, variations will be obvious to those skilled in the art without departing from the spirit of the invention, and the invention is therefore not to be construed as limited except as set forth in the annexed claims.

We claim:

1. A method for the preparation of organometallic compounds of metals of group IVa of the periodic table which comprises forming a mixture of cyclopentadiene with an amine having an ionization constant, measured in water, of at least $10^{-4}$, and subsequently forming a mixture of said first mixture with a group IVa metal compound representable by the formula $(RO)_2MeX_2$, wherein R is an alkyl hydrocarbon radical containing no more than 18 carbon atoms, Me is a metal of group IVa of the periodic table, and X is a halogen atom having an atomic number no higher than 43, thereby forming cyclopentadienyl metal dialkoxy monohalide.

2. A method for the preparation of organometallic compounds of metals of group IVa of the periodic table which comprises forming a mixture of cyclopentadiene with an amine having an ionization constant, measured in water, of at least $10^{-4}$, and subsequently forming a mixture of said first mixture with a group IVa metal compound representable by the formula $(RO)_2MeX_2$ wherein R is a butyl radical, Me is a metal of group IVa of the periodic table, and X is a halogen atom having an atomic number no higher than 43, and thereby forming cyclopentadienyl metal dibutoxy monohalide.

3. A method according to claim 1, wherein said fourth-group metal is selected from the group consisting of titanium and zirconium.

4. A method according to claim 1, wherein X is a halogen atom selected from the group consisting of chlorine and bromine.

5. A method according to claim 1, in which said basic condensing agent is a substituted-ammonia compound selected from the group consisting of lower secondary and tertiary alkyl amines and heterocyclic amines.

6. A method according to claim 5 in which said basic condensing agent is a lower secondary alkyl amine.

7. A method according to claim 5 in which said basic condensing agent is piperidine.

8. A method according to claim 5 in which said basic condensing agent is triethylamine.

9. A method for the preparation of organometallic compounds of metals of group IVa of the periodic table which comprises forming a mixture of cyclopentadiene with an amine having an ionization constant, measured in water, of at least $10^{-4}$, and subsequently forming a mixture of said first mixture with a group IVa metal compound representable by the formula $(RO)_2MeX_2$ wherein R is an alkyl hydrocarbon radical containing no more than 8 carbon atoms, Me is a mteal of group IVa of the periodic table, and X is a halogen atom having an atomic number no higher than 43, thereby forming cyclopentadienyl metal dialkoxy monohalide.

References Cited in the file of this patent

Birmingham et al.: "J.A.C.S." 76, p. 4179, Aug. 20, 1954.